May 28, 1957      A. W. ODELL      2,793,387
PIVOTAL CONNECTION

Filed Aug. 22, 1955      2 Sheets-Sheet 1

INVENTOR
Albert W. Odell

BY Ashley & Ashley

ATTORNEYS

May 28, 1957   A. W. ODELL   2,793,387
PIVOTAL CONNECTION
Filed Aug. 22, 1955   2 Sheets-Sheet 2

INVENTOR
Albert W. Odell
BY
ATTORNEYS

United States Patent Office 2,793,387
Patented May 28, 1957

2,793,387

PIVOTAL CONNECTION

Albert W. Odell, Dallas, Tex.

Application August 22, 1955, Serial No. 529,885

5 Claims. (Cl. 16—166)

This invention relates to new and useful improvements in pivotal connections.

One object of the invention is to provide improved means for pivotally connecting a pair of members for relative swinging movement between angularly related positions and for supporting the movable members in such positions.

Another object of the invention is to provide an improved pivotal connection having a pair of coacting members with a pair of guide means carried by one of the members for engagement by elements carried by the other member, the guide means being of such arrangement and contour as to facilitate pivotal movement of one member relative to the other member between inner and outer, angularly related positions as well as to support the movable member in such positions, said guide means and elements coacting to maintain said members in fixed relationships and control the direction of movement of said movable member.

An important object of the invention is to provide an improved pivotal connection, of the character described, wherein the movable member carries a pair of connecting elements for slidably engaging coacting guide openings formed in a relative fixed member, one of the openings being curved for imparting substantially arcuate movement to its engaged connecting element and limiting the travel thereof whereby said movable member moves longitudinally and transversely of the fixed member and the other opening being of such contour as to impart circuitous movement to its engaged element and pivotal movement to said movable member and coacting to maintain said movable member in angularly related positions during and at each end of its movement.

A construction designed to carry out the invention will be hereinafter described, together with other features of the invention.

Figure 1:
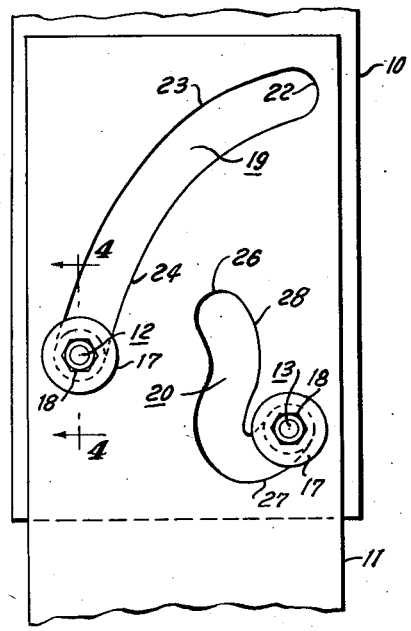
Figure 3:
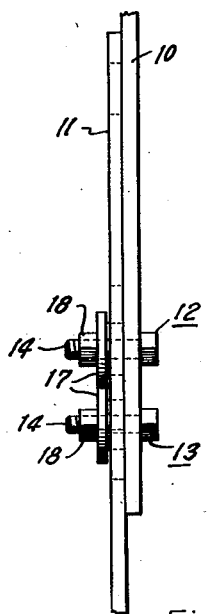
Figure 4:
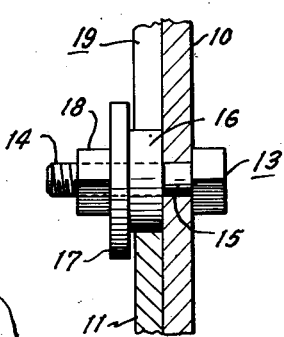
Figure 2:
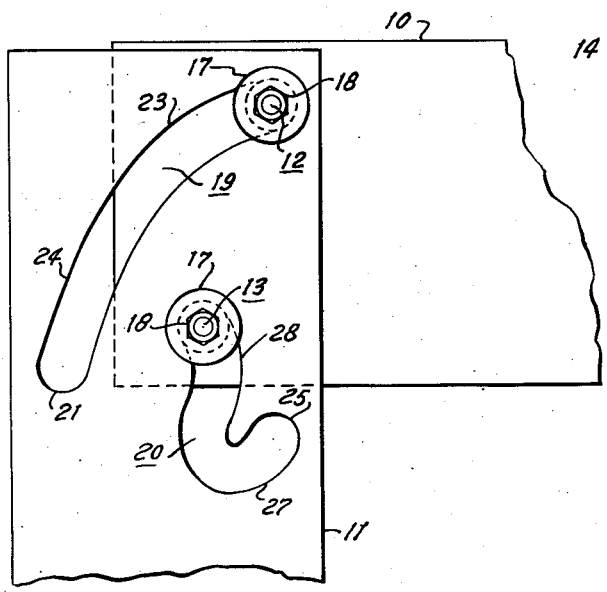
Figure 5:
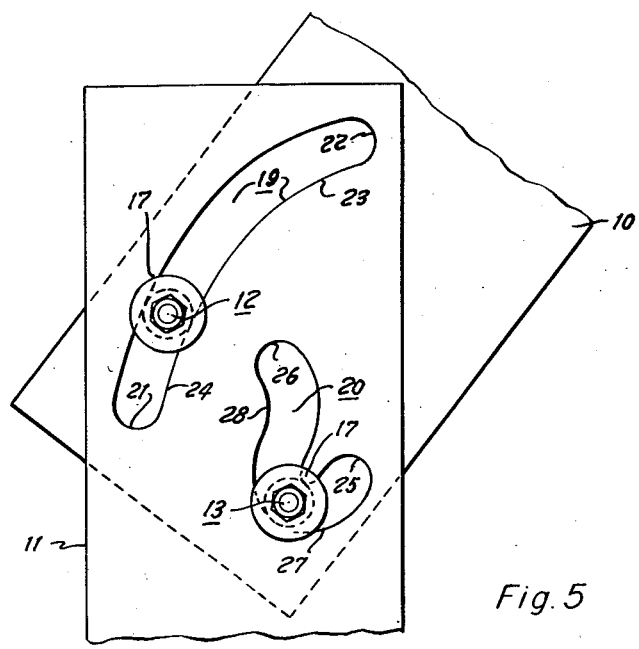
Figure 6:
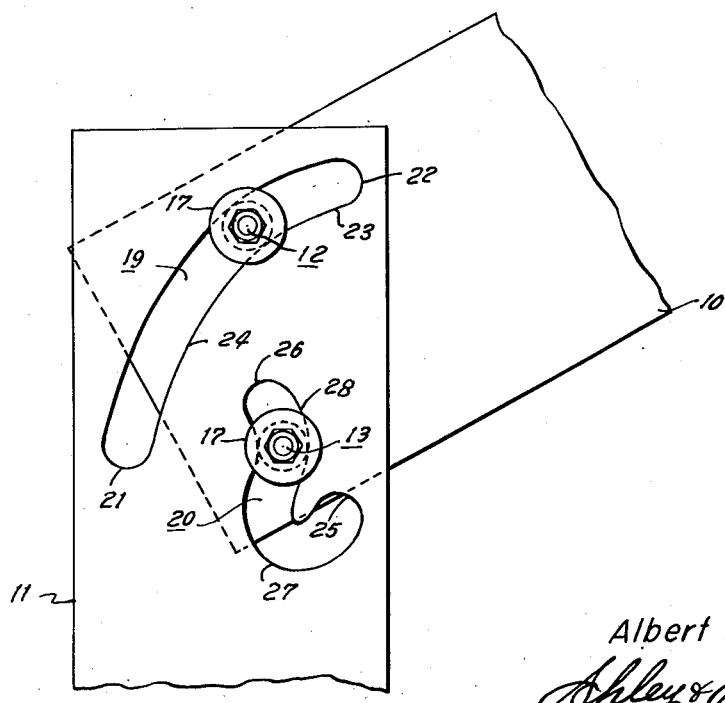

The invention will be more readily understood from a reading of the following specification and by reference to the accompanying drawing, wherein an example of the invention is shown, and wherein:

Fig. 1 is an elevational view of a pair of members pivotally connected in accordance with the invention, Fig. 2 is a view, similar to Fig. 1, showing one of the members in right angular relation to the other member, Fig. 3 is an end elevational view of the members in the position shown in Fig. 1, Fig. 4 is a transverse, vertical, sectional view, taken on the line 4—4 of Fig. 1, and Figs. 5 and 6 are views, similar to Fig. 1, showing the members in intermediate positions.

In the drawings, the numerals 10 and 11 designate a pair of overlying, parallel members which are adapted to be connected for relative pivotal movement between inner and outer, angularly related positions (Figs. 1 and 2) and which may be carried by or form the parts (not shown) of any suitable device. For example, one member may be fixed to a support (not shown) and the other member secured to or made integral with a movable part, such as a table top, shelf, seat or part of a sofa bed. One of the members, preferably the movable member 10, carries a pair of connecting or guide elements 12 and 13, respectively, in offset relation to each other with respect to the longitudinal and transverse axes of said member. The connecting elements are disposed in spaced relationship adjacent opposite longitudinal margins of the movable member with the element 12 inwardly of and slightly above the element 13 (Fig. 1). Although the connecting elements are subject to variation, each element is shown as including a bolt or fastener 14 extending through an opening 15 in the member 10 and having an annular roller bearing 16 and an annular spacer or washer 17 confined thereupon by a nut 18 (Fig. 4). The roller bearing 16 is of less diameter than the washer 17 and is relatively flat, being of a thickness slightly greater than the thickness of the fixed member 11 (Figs. 3 and 4).

A pair of guide openings or slots 19 and 20 are formed in the fixed member for receiving the connecting elements 12 and 13, respectively, and particularly the roller bearings thereof to connect the members in contiguous or face to face relationship. Preferably, the width of each slot is substantially equal to the diameter of the roller bearing 16 of its element for snug engagement by said bearing. Since the bearings are of greater thickness than the fixed member, clearance is provided for the relative movement of the other member. The slot 19 is of a definitely curved contour and extends upwardly and outwardly or longitudinally and transversely of the member 11. As shown, this slot may have its inner or lower end 21 adjacent one margin and its outer or upper end 22 may be adjacent the opposite margin of the member whereby the ends of said slot are positioned approximately 90° from each other. It is noted that the outer or upper portion 23 of the slot 19 has a different and less curvature than the inner or lower portion 24 whereby said outer portion has greater angularity than said inner portion. Manifestly, this slot guides the connecting element 12 and forces the member 10 upwardly and outwardly or longitudinally and transversely of the member 11 upon movement of said element from the inner or lower end 21 to the outer or upper end 22 of said slot.

For imparting pivotal movement to the member 10, the slot 20 is hook-shaped and has lower and upper ends 25 and 26 connected by lower and upper bends or portions 27 and 28 curved reversely to each other. The slot lower end 25 is positioned adjacent the outer margin of the member 11 in substantially vertical alinement with the outer end 22 of the slot 19, while the slot upper end 26 is disposed inwardly of said lower end and above the inner end 21 of said slot 19. The curvature of the lower slot portion 27 is very small whereby said portion is substantially U-shaped so as to provide a reverse bend of approximately 180°. It is pointed out that this bend or curved portion 27 extends diagonally or at an angle between the longitudinal and transverse axes of the member 11 with its inner extremity above its outer extremity. From the inner, upper extremity of the reverse bend 27, the upper portion or bend 28 of the slot 20 curves inwardly toward the medial portion of the slot 19 or in a direction reverse to the curvature of said bend 27. Although the upper and lower slot portions or bends are of substantially equal length, said upper portion has a large variable curvature and little angularity in comparison to said lower portion. As a result, the upper bend 28 extends uprightly or longitudinally so as to position the upper end 25 in substantially vertical alinement with the upper extremity of the lower bend 27. It is readily apparent that the slot 20 guides the connecting element 13 and controls the angular relation of the movable member 10.

Upon initial movement of the member 10, the engagement of the connecting or guide element 13 with the reverse bend 27 of the slot 20 forces said member to pivot about the axis of said bend laterally outward or transversely of the member 11 (Fig. 5). Although the connecting element travels through the U-shaped path of the reverse bend and moves downwardly and then upwardly, a smooth upward and outward or longitudinal and transverse swinging movement is imparted to the movable member. By the time the element 13 reaches the upper extremity of the reverse bend and commences to enter the upper bend 28, the other connecting or guide element 12 has traveled approximately one-half the length of the slot 19 and the movable member is positioned at an angle of approximately 45° relative to the longitudinal axis of the fixed member 11. Of course, the curvature of the lower portion 24 of the slot 19 coacts with the curvature of the reverse bend 27 of the slot 20 in causing this movement of the member 10. Due to the large curvature of the upper bend 28 and its effective length, considerable upward or longitudinal movement is transmitted to the movable member by the travel of the element 13 through said bend. In fact, the medial movement of the member 10 is in substantially a straight line due to the upright disposition of the bend 28. Primarily, the relatively small curvature or angularity of the upper portion 23 of the slot 19 forces the movable member to turn during its subsequent movement (Fig. 6). The upper bend 28 of the other slot, however, contributes to this turning movement in the same manner that the lower portion 24 coacts with the reverse bend 27 during the initial movement. In fact, the final turn of the movable member is controlled by the curvature of the upper bend. It is noted that the slot ends 21 and 25 coact to support the elements and the member 10 in their lower or inner position (Fig. 1) and that said elements and members are supported in their upper or outer portions by the coaction of the slot ends 22 and 26 (Fig. 2).

From the foregoing, it is manifest that an improved pivotal connection has been provided and that the connection permits longitudinal and transverse or upward and outward movement of one member relative to another member simultaneously with the pivoting of the movable member. The movement is smooth and continuous and there is no binding due to the coaction of the connecting elements and their guide openings or slots. It is noted that the particular form of the connecting elements 12 and 13 is not critical and that the construction shown and described herein merely represents one example thereof. Since there are so many types of connecting elements suitable for the purpose, no attempt has been made to illustrate the variations thereof. The elements function essentially as guide means and need not provide the actual or only connection between the members. It is contemplated that the elements may be confined in the guide openings by conventional arrangements or constructions (not shown) and that said openings may be in the form of channels or grooves rather than slots, since the essence of the invention resides in the coaction between said elements and openings for guiding the relative movement between the members and not in the exact illustrated structure. Therefore, the elements may only engage within the openings without positively fastening the members together. In addition, the elements and openings coact to support the movable member in angularly related positions with respect to the fixed member. In Fig. 1, the elements engage the inner or lower ends of the guide openings to support the movable member in alinement with the fixed member, while said movable member is supported in angular, preferably right angular, relation to said fixed member by said elements engaging the outer or upper ends of said openings as shown in Fig. 2. It is pointed out that the angular relationship of the movable member may be greater or less than 90°.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pivotal connection including a pair of members adapted to undergo relative swinging movement between angularly related positions, a pair of guide elements carried by one of the members, and a pair of guide means carried by the other of said members for engagement by and coaction with the elements, one of the guide means being substantially arcuate for imparting complementary movement to its engaged element so as to move one of said members longitudinally and transversely of the other member, the other guide means being shorter than said first mentioned guide means and positioned on the concave side of said arcuate guide means and consisting of a pair of bends directed reversely of each other for imparting circuitous movement to the other element so as to pivot the movable member relative to said other member, one of said bends in said shorter guide means extending toward said arcuate guide means.

2. A pivotal connection as set forth in claim 1 wherein the guide elements are offset relatively to each other longitudinally and transversely of the member carrying the same.

3. A pivotal connection as set forth in claim 1 wherein the guide elements are carried by the movable member and the guide means by the other member.

4. A pivotal connection as set forth in claim 1 wherein the guide means include openings formed in one of the members.

5. A pivotal connection as set forth in claim 1 wherein the guide means include slots formed in one of the members, the guide elements extending through the slots for connecting said members.

References Cited in the file of this patent

UNITED STATES PATENTS

| | | |
|---|---|---|
| 529,171 | Hegenscheidt | Nov. 13, 1894 |
| 991,262 | Aurand | May 2, 1911 |
| 2,210,762 | Itzigson | Aug. 6, 1940 |

FOREIGN PATENTS

| | | |
|---|---|---|
| 474,128 | Italy | Sept. 3, 1952 |